United States Patent [19]

Stroud

[11] Patent Number: 5,845,916

[45] Date of Patent: Dec. 8, 1998

[54] HANDLE FOR INFANT STROLLER

[75] Inventor: David J. Stroud, Dayton, Ohio

[73] Assignee: Lisco Inc., Tampa, Fla.

[21] Appl. No.: 655,359

[22] Filed: May 24, 1996

[51] Int. Cl.$^6$ ...................................................... B62B 7/00
[52] U.S. Cl. .................................. 280/47.38; 280/47.34; 16/110 R; 16/111 R; 16/DIG. 5; D12/178
[58] Field of Search ............... 280/47.34, 47.36, 280/47.371, 47.17, 47.315, 642, 644, 655.1; D8/300, DIG. 8; D12/178; 16/110 R, 111 R, DIG. 5, DIG. 12, DIG. 19

[56] References Cited

U.S. PATENT DOCUMENTS

| 534,434 | 2/1895 | Frost | 403/329 |
|---|---|---|---|
| 1,085,543 | 1/1914 | Collins | 403/329 |
| 1,512,053 | 10/1924 | Rilinghafer . | |
| 2,501,940 | 3/1950 | Hibbard | 403/329 |
| 2,615,725 | 10/1952 | Person | 280/644 |
| 2,982,586 | 5/1961 | Gliebe | 403/326 |
| 3,096,917 | 7/1963 | Gudiksen | 224/6 |
| 3,575,455 | 4/1971 | Bloch | 294/16 |
| 4,207,997 | 6/1980 | Croyle | 224/55 |
| 5,143,419 | 9/1992 | Tepper et al. | 297/183 |
| 5,207,476 | 5/1993 | Payne | 297/183 |
| 5,409,292 | 4/1995 | Kain et al. | 16/110 R |
| 5,433,469 | 7/1995 | Cassels | 280/655 |
| 5,454,584 | 10/1995 | Haut et al. | 280/642 |
| 5,516,190 | 5/1996 | Kain et al. | 297/183.6 |
| 5,581,915 | 12/1996 | Lobato | 280/47.34 X |

FOREIGN PATENT DOCUMENTS

| 2564405 | 11/1985 | France | 280/650 |
|---|---|---|---|
| 1050202 | 12/1966 | United Kingdom | 403/326 |

*Primary Examiner*—Robert J. Oberleitner
*Assistant Examiner*—Syrone M. Lee
*Attorney, Agent, or Firm*—Donald R. Bahr; Laubscher & Laubscher

[57] ABSTRACT

A handle for an infant stroller includes a pair of substantially parallel opposed arms connected with the frame of the stroller and extending upwardly therefrom. A gripping section interconnects the upper ends of the arms. The gripping section includes a center leg arranged in a longitudinal vertical plane, preferably aligned with the centerline of the stroller. The gripping section preferably has a Z-shaped configuration with opposite outer legs extending from said center leg and connected with said other ends of said arms. The gripping section is titled forward relative to a lateral vertical plane.

7 Claims, 2 Drawing Sheets

HANDLE FOR INFANT STROLLER

BACKGROUND OF THE INVENTION

The present invention relates generally to infant strollers and more particularly to a handle which is used in conjunction with an infant stroller.

Many strollers are available today which have various handle structures. Most of these strollers have a handle which comprises two parallel arms attached on opposite sides of the stroller front and a transverse gripping section extending between the parallel arms. While this arrangement is satisfactory for forward propulsion, it normally requires the use of both hands for guiding and turning the stroller. If the operator of the stroller has one hand occupied with packages or another infant, control of the stroller becomes much more cumbersome.

BRIEF DESCRIPTION OF THE PRIOR ART

Strollers with various handle configurations are well-known in the patented prior art as evidenced by U.S. Pat. No. 5,454,584 which discloses a collapsible stroller which uses an arcuate gripping section designed to increase control of the stroller, but still requires the use of both hands for ease of operation.

U.S. Pat. No. 5,207,476 discloses an infant carrier having a handle which is constructed so that the gripping part of the handle is substantially parallel to the longitudinal axis of the carrier, whereby the palm of the handle is facing towards the carrier itself. The handle is constructed by having the legs terminate upwardly in a bifurcated portion with opposite parts of the bifurcation being connected by rods and the ultimate handle being secured transversely between these rods.

The present invention was developed in order to provide a handle for an infant stroller which allows the operator of the stroller to grip the handle with either one or two hands so that in either mode of operation, the operator can adequately control the stroller for both movement and steering.

SUMMARY OF THE INVENTION

Accordingly, it is a primary object of the invention to provide an infant stroller having a seat supported by a frame mounted on wheels including a handle having first and second substantially parallel opposed arms, one end of each of the arms being connected with the frame on opposite sides thereof. Each of the arms extends rearwardly and upwardly from the frame with the other ends of the arms terminating in a spaced relation. A gripping section interconnects the other ends of the arms. The gripping section has a central leg arranged in a longitudinal vertical plane which bisects the stroller. Preferably, the center leg is tilted forward and aligned with the centerline of the stroller within the longitudinal vertical plane.

According to another object of the invention, the handle is formed as a unitary structure.

It is yet another object of the invention to provide a handle having a Z-shaped configuration which is comprised of two separate legs joined together at the gripping section.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
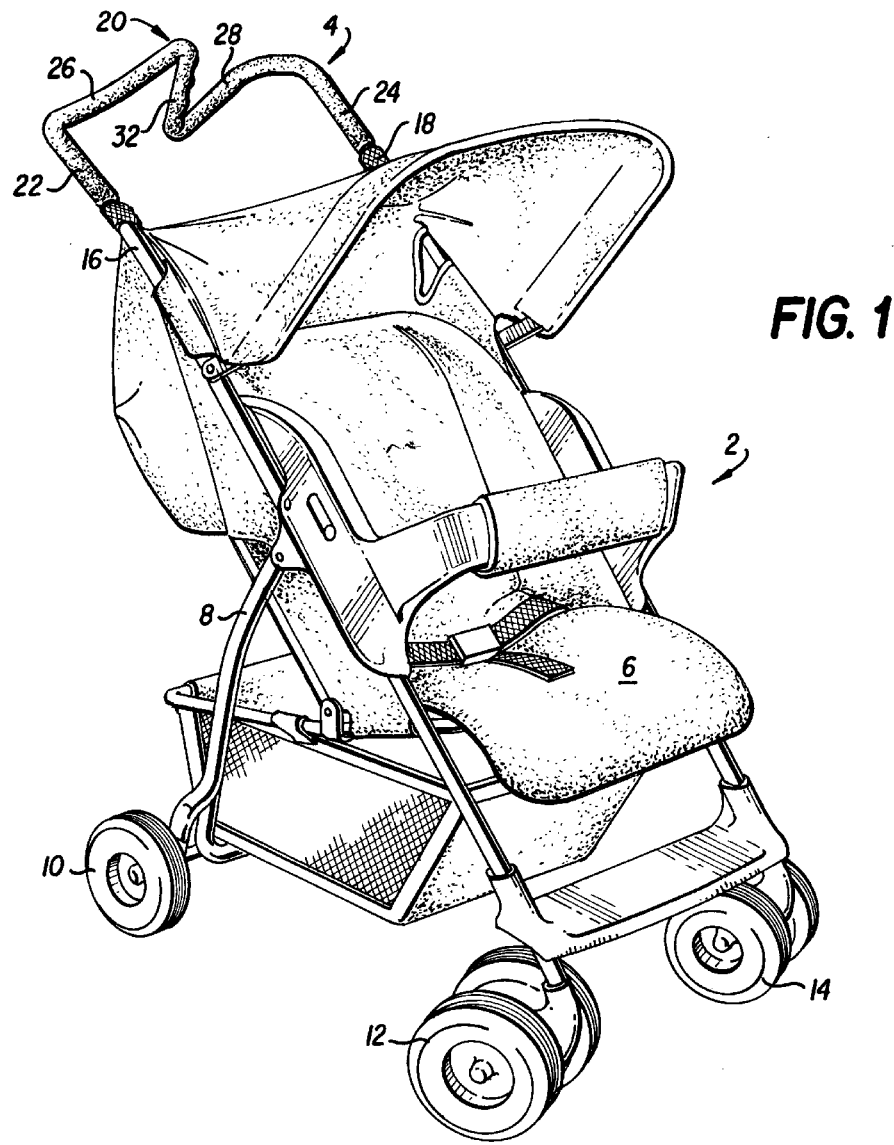
FIG. 1 is a perspective view of a stroller including the improved handle according to the invention.

Referring initially to FIG. 1, there is shown a stroller 2 including the improved handle 4 according to the invention. The stroller can be any standard stroller and includes a seat 6 mounted on a frame 8 which is supported by wheels 10, 12, and 14. The front wheels 12 and 14 are caster type wheels which enable the stroller to turn from side to side.

The handle 4 of the stroller includes a pair of parallel arms 16 and 18 which are attached at a lower end to opposite sides of the stroller frame 8. The arms extend rearwardly and upwardly from the frame. The upper ends of the arms are spaced from each other as shown in FIG. 1. A gripping section 20 extends between the upper ends of the arms 16 and 18. The gripping section comprises outer legs 22 and 24 which are adapted to receive the upper ends of the arms 16 and 18 in order to connect the gripping section with the arms of the handle.

Figure 2:
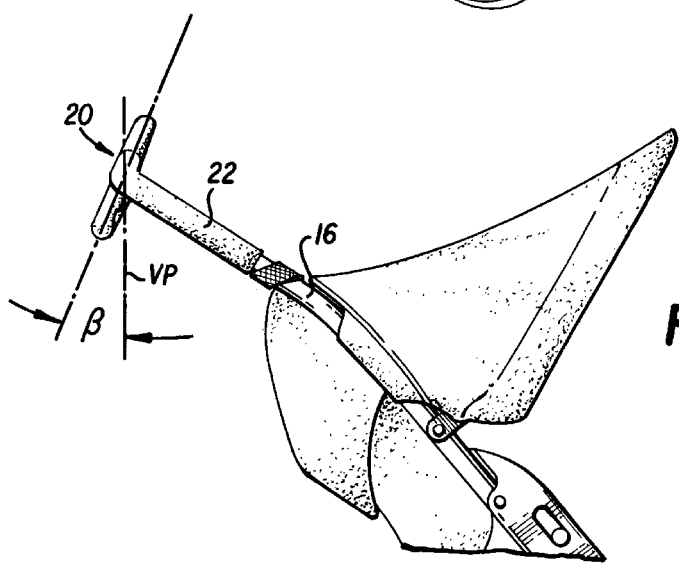
FIG. 2 is a side plan view of the stroller handle of FIG. 1.
Figure 3:
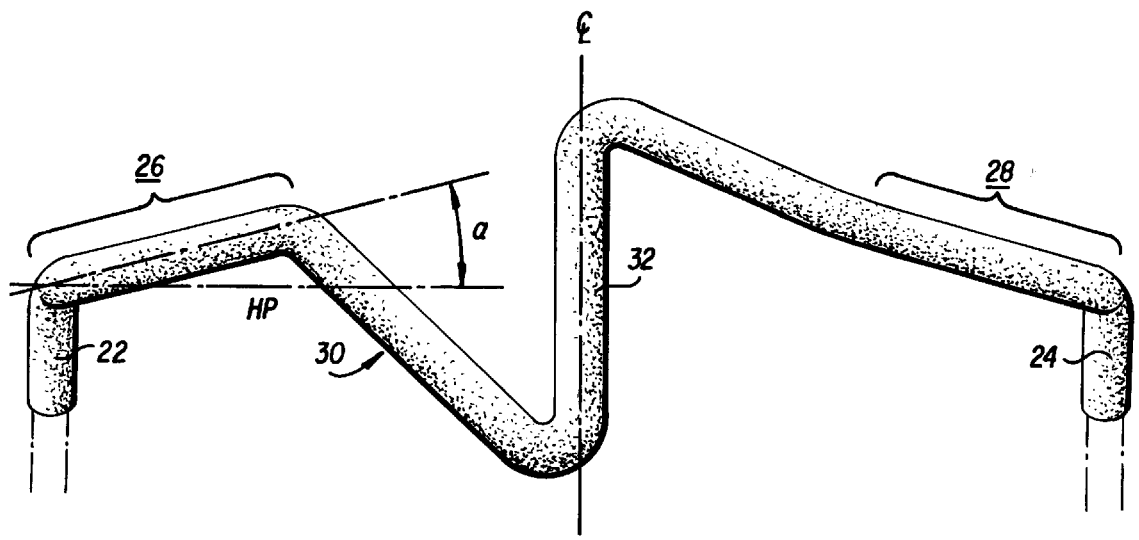
FIG. 3 is a front plan view of the gripping portion of the stroller handle according to the invention.

Referring now to FIGS. 2 and 3, the gripping section 20 will be described in greater detail. Between the outer legs 22 and 24, the gripping section comprises a handgrip as shown in detail in FIG. 3. Adjacent to the outer legs 22 and 24, the handgrip includes first and second portions 26 and 28 which are arranged at an angle $\alpha$ relative to a horizontal plane HP passing through the tops of the outer legs, where $\alpha$ is between 10° and 30°. The leg 22 and first portion 26 can have an arcuate configuration which is mirrored by the leg 24 and second portion 28. Between the first and second portions is a portion 30 which preferably has a Z-shaped configuration as shown in the drawing, although other configurations such as an S-shape are possible so long as the center leg 32 is contained within a longitudinal vertical plane which bisects the stroller. The longitudinal plane, and thus the center leg, is preferably aligned with the centerline of the stroller. The first, second and Z-shaped portions 26, 28, and 30 of the handgrip are all arranged in a common plane, with the plane being tilted forward at an angle $\beta$ relative to a lateral vertical plane VP as shown in FIG. 2, where $\beta$ is also between 10° and 30°.

Figure 4:
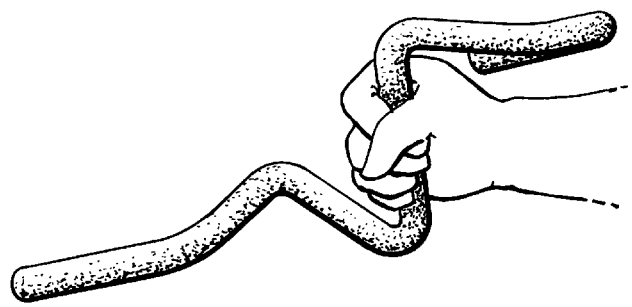
FIGS. 4 and 5 are perspective views of the handle gripping portion illustrating use in the one-hand and two-hand modes of operation, respectively.
Figure 5:
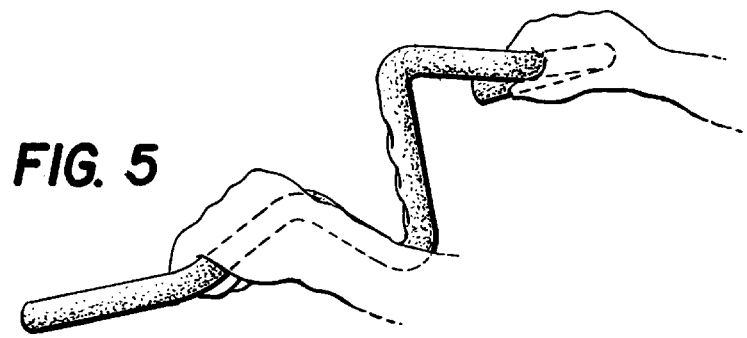

FIGS. 4 and 5 illustrate the different manners in which the stroller handle according to the invention can be gripped by the operator. In FIG. 4, the center leg 32 of the handgrip is grasped by one hand of the operator. Because the center leg lies along the centerline of the stroller, the stroller can easily be manipulated for movement in the forward and reverse directions as well as to either side with one hand without causing any discomfort to the hand or wrist of the operator because the palm of the hand will be in a natural extended handshake position. With a standard linear handle, it is quite difficult to control a stroller with only one hand. Accordingly, if the person attending the stroller has packages in one hand, he could still grip the center leg 32 and easily control the stroller. In FIG. 5, the operator places both hands on the handgrip on opposite sides of the Z-shaped section to push and guide the stroller.

The stroller handle according to the invention can be formed of metallic arms and a gripping section which are interconnected as set forth above. Alternatively, the arms and gripping section may be formed as a unitary structure of metal or molded synthetic plastic material.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An infant stroller, comprising
   (a) a frame;
   (b) a plurality of wheels connected with said frame;
   (c) a seat connected with said frame for supporting an infant,
   (d) a handle including first and second substantially parallel opposed arms, one end of each of said arms being connected with a side of said frame;
   (e) each of said arms extending upwardly from said frame, the other ends of said arms terminating in a spaced relationship; and
   (f) a gripping section interconnecting said other ends of said arms, said gripping section having a center leg substantially contained within a longitudinal vertical plane which bisects the stroller.

2. An infant stroller as defined in claim 1, wherein said center leg is aligned with a centerline of the stroller contained in said longitudinal vertical plane.

3. A infant stroller as defined in claim 2, wherein said gripping section is tilted forward relative to a lateral vertical plane.

4. An infant stroller as defined in claim 3, wherein said gripping section has a Z-shaped configuration with opposite outer legs extending from said center leg and connected with said outer ends of said arms.

5. A handle as defined in claim 4, wherein said gripping section is a unitary metallic structure.

6. A handle as defined in claim 4, wherein said gripping section is a unitary molded structure.

7. A handle as defined in claim 4, wherein said outer legs are arcuate and are substantually mirror images of each other.

* * * * *